(12) United States Patent
Ya et al.

(10) Patent No.: US 12,514,952 B2
(45) Date of Patent: Jan. 6, 2026

(54) POSITIVE AND NEGATIVE OXYGEN ION AIR PURIFICATION SYSTEM USING DIELECTRIC BARRIER DISCHARGE FOR RAIL TRANSPORT

(71) Applicants: KNORR-BREMSE ESPANA SA, Getafe (ES); MERAK JINXIN AIR CONDITIONING SYSTEMS (WUXI) CO., LTD., Jiangsu (CN)

(72) Inventors: Mingliang Ya, Jiangsu (CN); Zhenggen Wang, Jiangsu (CN); Shangqun Zhang, Jiangsu (CN)

(73) Assignees: KNORR-BREMSE ESPANA, S.A. (ES); MERAK JINXIN AIR CONDITIONING SYSTEMS (WUXI) CO., LTD. (CN)

( * ) Notice: Subject to any disclaimer, the term of this patent is extended or adjusted under 35 U.S.C. 154(b) by 579 days.

(21) Appl. No.: 17/925,544

(22) PCT Filed: May 14, 2021

(86) PCT No.: PCT/CN2021/093804
§ 371 (c)(1),
(2) Date: Nov. 15, 2022

(87) PCT Pub. No.: WO2021/228221
PCT Pub. Date: Nov. 18, 2021

(65) Prior Publication Data
US 2023/0190985 A1    Jun. 22, 2023

(30) Foreign Application Priority Data

May 15, 2020   (CN) .......................... 202010413543.1
May 15, 2020   (CN) .......................... 202020810753.X

(51) Int. Cl.
*A61L 9/22*     (2006.01)
*B03C 3/04*     (2006.01)
(Continued)

(52) U.S. Cl.
CPC ........ *A61L 9/22* (2013.01); *B03C 3/04* (2013.01); *B03C 3/368* (2013.01); *B03C 3/41* (2013.01);
(Continued)

(58) Field of Classification Search
CPC .. A61L 9/22; A61L 2209/111; A61L 2209/15; A61L 2209/16
See application file for complete search history.

(56) References Cited

U.S. PATENT DOCUMENTS

| | | | |
|---|---|---|---|
| 2005/0031503 A1* | 2/2005 | Fox ........................ | F24F 8/192 422/186.04 |
| 2009/0042502 A1 | 2/2009 | Kim et al. | |

(Continued)

FOREIGN PATENT DOCUMENTS

| | | |
|---|---|---|
| DE | 102016220476 A1 | 6/2017 |
| JP | 2009126349 A | 6/2009 |

(Continued)

OTHER PUBLICATIONS

Machine Translation of WO2015079753 (Year: 2015).*
International Search Report and Written Opinion corresponding to PCT/CN2021/09380 dated Aug. 19, 2021.

*Primary Examiner* — Lessanework Seifu
(74) *Attorney, Agent, or Firm* — Barnes & Thornburg LLP

(57) ABSTRACT

A positive and negative oxygen ion air purification system uses dielectric barrier discharge for rail transport. The system includes: an air intake device including a first damper and second damper, wherein the first damper is in communication with the second damper; an evaporator disposed (Continued)

within the air intake device, wherein gas flowing through the first damper and second damper passes through the evaporator; a purification device, wherein gas flowing through the first damper and second damper passes through the purification device, wherein the purification device includes a mounting plate, a power supply module and an ion generation module, the purification device is disposed on the air intake device by the mounting plate, and the power supply module includes an input end, a transformer, and an output end; a detection device; and a control device connected to the detection device, the air intake device and the purification device.

8 Claims, 2 Drawing Sheets

(51) Int. Cl.
| | | |
|---|---|---|
| | *B03C 3/36* | (2006.01) |
| | *B03C 3/41* | (2006.01) |
| | *B03C 3/66* | (2006.01) |
| | *B03C 3/84* | (2006.01) |
| | *B61D 27/00* | (2006.01) |
| | *F24F 8/192* | (2021.01) |
| | *F24F 8/30* | (2021.01) |
| | *F24F 110/20* | (2018.01) |
| | *F24F 110/64* | (2018.01) |
| | *F24F 110/66* | (2018.01) |
| | *F24F 110/70* | (2018.01) |

(52) U.S. Cl.
CPC ............... *B03C 3/66* (2013.01); *B03C 3/84* (2013.01); *B61D 27/0009* (2013.01); *F24F 8/194* (2021.01); *F24F 8/30* (2021.01); *A61L 2209/111* (2013.01); *A61L 2209/15* (2013.01); *A61L 2209/16* (2013.01); *B03C 2201/24* (2013.01); *B03C 2201/30* (2013.01); *F24F 2110/20* (2018.01); *F24F 2110/64* (2018.01); *F24F 2110/66* (2018.01); *F24F 2110/70* (2018.01)

(56) References Cited

U.S. PATENT DOCUMENTS

| | | | |
|---|---|---|---|
| 2017/0007958 A1* | 1/2017 | Ui | ................ B01D 53/8668 |
| 2018/0169287 A1* | 6/2018 | Nettesheim | ............ A61L 9/015 |

FOREIGN PATENT DOCUMENTS

| | | |
|---|---|---|
| KR | 101884814 B1 | 8/2018 |
| KR | 20190062211 A | 6/2019 |
| WO | 2015079753 A1 | 6/2015 |

\* cited by examiner

POSITIVE AND NEGATIVE OXYGEN ION AIR PURIFICATION SYSTEM USING DIELECTRIC BARRIER DISCHARGE FOR RAIL TRANSPORT

CROSS REFERENCE AND PRIORITY CLAIM

This patent application is a U.S. National Phase of International Patent Application No. PCT/CN2021/093804 filed May 14, 2021, which claims priority to Chinese Patent Application No. 202010413543.1 and Chinese Patent Application No. 202020810753. X, the disclosure of which being incorporated herein by reference in their entireties.

FIELD

The present disclosure relates to the field of air purification in rail transport, in particular to a positive and negative oxygen ion air purification system using dielectric barrier discharge for rail transport.

BACKGROUND

The rail transport vehicle pertains to a public transport device. With raised awareness in health, higher and higher demands for air quality within the rail transport vehicle appear. Pollutants within the rail transport vehicle mainly include inhalable dust particles (containing PM2.5, PM10 and the like), volatile organic substances (briefly referred to VOC, including aldehydes, benzenes, odor substances and the like), and air microorganisms (containing bacteria, virus and the like).

SUMMARY

Embodiments of the present disclosure provide a positive and negative oxygen ion air purification system using dielectric barrier discharge for rail transport, which is capable of purifying the air within the rail transport space.

BRIEF DESCRIPTION OF THE FIGURES

To make the above-described utility more apparent and straightforward, disclosed embodiments will be presented below in conjunction with the accompanying drawings. To more explicitly explain the embodiments of the present disclosure or the technical solutions in the prior art, a brief introduction will be given below for the accompanying drawings required to be used in the description of the embodiments or the prior art. The accompanying drawings illustrated below are merely some of the embodiments of the present disclosure. For those ordinarily skilled in the art, other accompanying drawings may also be obtained according to such accompanying drawings without inventive effort.

DETAILED DESCRIPTION

Figure 1A:
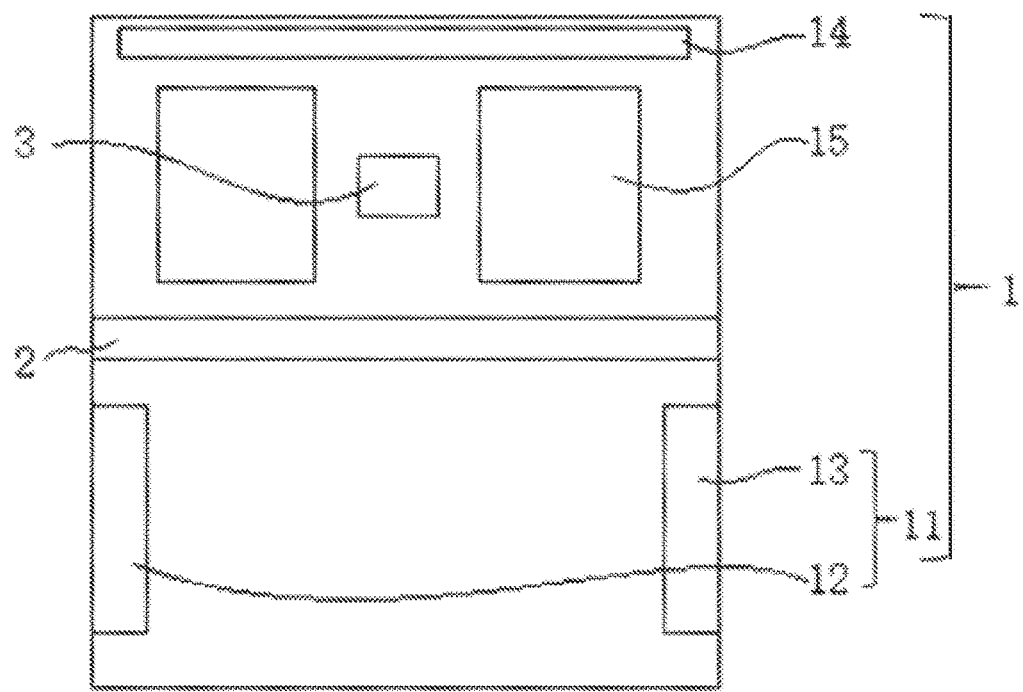
FIG. 1A is a schematic structural view of a positive and negative oxygen ion air purification system using dielectric barrier discharge for rail transport in an embodiment of the present disclosure.

In a majority of the existing rail transport vehicles, they are merely equipped with a set of G3/G4 coarse filter within their air-conditioning systems for air purification. The coarse filter only has a certain filtering effect on large particles such as PM10, but has little effect on eliminating PM2.5, volatile organic substances and air microorganisms or the like. Moreover, it is also likely to breed bacteria on a screen of the coarse filter, thereby causing secondary pollution.

Common purifiers such as ultraviolet lamps and needle point discharges require frequent replacement of consumables, have a complicated structure and a large volume, thereby increasing the difficulty in installation. At the same time, most of traditional air purification devices are continuous output devices. In the case where the air purification device is turned on, the purification unit of the purification device works continuously. When the purification device is malfunctioned, it is difficult for the user to determine an operational state of the air purification device. As a result, there is such a circumstance that the air quality is decreased but the purification device cannot provide an effective feedback, so that it is not convenient for the purification device to be readily cleaned and maintained.

Therefore, the existing air purification systems for rail transport vehicles gradually cannot meet the demands of passengers on the air quality within the vehicle.

To overcome the defects in the prior art, in the embodiments of the present disclosure, there is provided a positive and negative oxygen ion air purification system using dielectric barrier discharge for rail transport, which is capable of purifying the air within the rail transport space.

To achieve the above-described target, the embodiments of the present disclosure disclose a positive and negative oxygen ion air purification system using dielectric barrier discharge for rail transport, including:

an air intake device including a first damper and a second damper, wherein the first damper is in communication with the second damper;

an evaporator disposed within the air intake device, wherein gas flowing through the first damper and the second damper passes through the evaporator;

a purification device, wherein the gas flowing through the first damper and the second damper passes through the purification device, and wherein the purification device includes a mounting plate, a power supply module, and an ion generation module, the purification device is disposed on the air intake device by the mounting plate, and the power supply module includes an input end, a transformer, and an output end;

a detection device;

a control device, which is connected to the detection device, and which is connected to the air intake device and the purification device.

Optionally, gas is delivered between the first damper and the second damper through a blower.

Optionally, the first damper includes one or both of a return air damper and a fresh air damper.

Optionally, the ion generation module includes a high-voltage emission electrode plate, a filling medium, and a grounding electrode plate that are arranged to be sequentially attached to each other.

Optionally, the filling medium may be ceramic and/or glass.

Optionally, the purification device further includes a protection device disposed downstream of the ion generation module, wherein the protection device is coated on a metal material downstream of the ion generation module, and the protection device is of a non-metallic material.

Optionally, the power supply module provides high-voltage alternating current to the ion generation module.

Optionally, the control device is disposed within an air-conditioning unit, within a carriage, and/or on a platform of the rail transport.

Optionally, the detection device includes a sensor for detecting concentrations of positive and negative oxygen ions, PM2.5, CO2 and/or VOC, and/or humidity.

Optionally, the detection device is disposed at the first damper, within an air-conditioning unit, within an air duct of the vehicle, within a carriage, and/or on a platform.

Disclosed embodiments provide technical utility by: the air within a platform and a carriage of the rail transport is purified, so that it is possible to effectively clear up dust (including PM2.5, PM10 and the like), remove microorganisms and eliminate volatile organic substances, improving the air quality for rail transport, and optimizing the riding experience of passengers. Moreover, there are no harmful substances produced during the purification process, and it is convenient for maintenance and operation with a low maintenance cost.

Technical utility of the embodiments of the present disclosure will be explicitly and completely described below in conjunction with the accompanying drawings in the embodiments of the present disclosure. The embodiments described are merely some of the embodiments of the present disclosure, rather than all the embodiments. On the basis of the embodiments of the present disclosure, all the other embodiments obtained by those skilled in the art fall into the protection scope of the present disclosure without any inventive effort involved.

In the description of the present disclosure, it is to be explained that, the orientation or position relations indicated by the terms such as "up", "down", "bottom", "inside", "outside", which are based on the orientation or position relations illustrated by the accompanying drawings, are merely for facilitating description of the present disclosure and simplifying the description, rather than indicating or implying that the device or element referred thereto has to present a particular orientation, and be constructed and operated in a particular orientation, and thus cannot be understood as limiting the present disclosure. In addition, the terms such as "first" and "second" are only intended for descriptive purposes, but cannot be understood as indicating or implying relative importance or implicitly indicating the number of technical features as indicated. Thereby, the features defined with terms such as "first" and "second" may explicitly or implicitly include one or more of these features.

To achieve the above-described target, the present disclosure provides a positive and negative oxygen ion air purification system using dielectric barrier discharge for rail transport, which incorporates the functions of clearing up dust and eliminating microorganisms and volatile organic substances within the vehicle, may be provided in platforms and rail transport vehicles such as high-speed railways, subways, inter-city rail services, large railways and trams.

In the embodiments of the drawings, the positive and negative oxygen ion air purification system using dielectric barrier discharge for rail transport comprises an air intake device 1, an evaporator 2, a purification device 3, a detection device, and a control device.

Figure 1B:
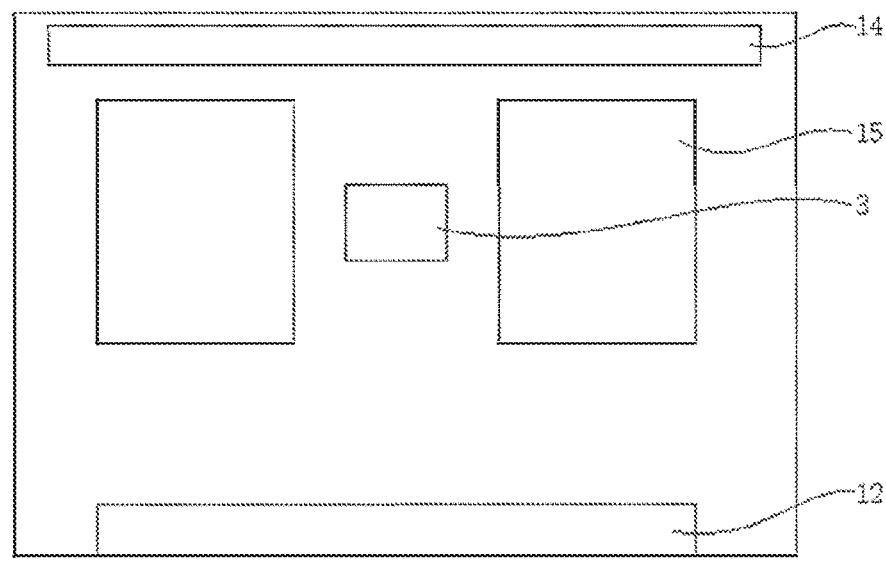
FIG. 1B is a schematic structural view of a positive and negative oxygen ion air purification system using dielectric barrier discharge for rail transport in another embodiment of the present disclosure.

The air intake device 1 includes a first damper 11 and a second damper 14. Gas may be delivered between the first damper 11 and the second damper 14 through a blower 15. The first damper 11 may be in communication with the second damper 14. The first damper 11 includes one or both of a return air damper 12 and a fresh air damper 13, wherein the first damper 11 includes a return air damper 12 and a fresh air damper 13 in the embodiment of FIG. 1A, and the first damper 11 includes a return air damper 12 in the embodiment of FIG. 1B. The return air damper 12 can be provided on a platform or alternatively on a carriage. The fresh air system can be provided on the carriage.

Further, the return air damper 12 may be configured to inhale air outside the carriage, and the fresh air damper 13 may be configured to inhale air from a relatively enclosed space such as the carriage.

Further, the second damper 14 outputs the purified gas, and the second damper 14 can be provided on the platform and/or within the carriage.

Further, the evaporator 2 may be provided between the first damper 11 and the second damper 14, so that gas enters from the first damper 11, passes through the evaporator 2 and is output from the second damper 14.

Further, the purifying device 3 may be provided between the first damper 11 and the second damper 14, so that gas enters from the first damper 11, passes through the purifier 3, and may be output from the second damper 14.

Figure 2:
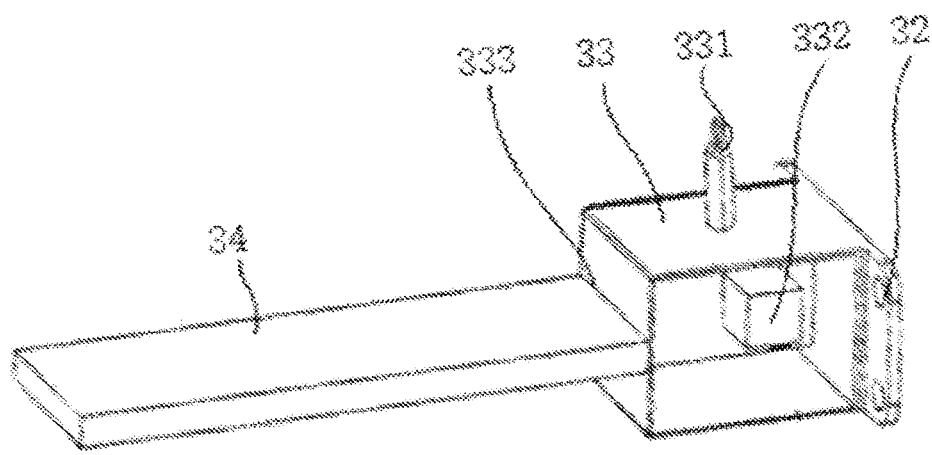
FIG. 2 is a schematic structural view of a positive and negative oxygen ion air purification system using dielectric barrier discharge for rail transport in an embodiment of the present disclosure.

Further, referring to FIG. 2, the purification device 3 includes a mounting plate 32, a power supply module 33, a transformer 332 and an ion generation module 34.

The purification device 3 may be mounted between the first damper 11 and the second damper 14 by the mounting plate 32. The power supply module 33 may include an input end 331, a transformer 332, and an output end 333. The power supply module 33 may be connected to a control power supply (such as DC110V) or a power supply (such as AC380V, 50 Hz) of the vehicle by the input end 331, and the transformer 332 converts electric energy input from the input end 331 into high-voltage electricity and supplies the same to the ion generation module 34.

Further, the location where the purification device 3 is mounted within the unit may be downstream of the fresh air damper 13, downstream of the return air damper 12, in an air mixing room (which is arranged between the first damper 11 and the second damper 14), and upstream of the second damper 14.

The ion generation module 34 may be configured to generate positive and negative oxygen ions, and includes a high-voltage emission electrode plate in the interior, a filling medium in the middle, and a grounding electrode plate in the exterior. The high-voltage emission electrode plate and the grounding electrode plate form an electric field with a precise size. The electrode structure and the discharge parameters are controlled by the control device, so that the ion generation module 34 performs a discharge operation at a relatively low voltage, generates free electrons with high potential energy and high kinetic energy and inelastically collides with oxygen molecules to stimulate the action of oxygen without ionizing nitrogen or dissociating oxygen in the air, thereby avoiding that ozone or nitrogen oxide compounds are produced during ionization.

In addition, the positive and negative oxygen ions generated by the ion generation module 34 render an electron avalanche phenomenon when the voltage between the two electrodes reaches a breakdown threshold voltage in the case where an alternating high-voltage current is input. The dielectric breakdown by the gas forms a discharge such that e− (electrons) rush out from the dielectric gap at a speed of 60+ km/s or more. They produce I elastic collision and II inelastic collision with oxygen in the air, wherein two possible oxygen ion states are produced upon the II inelastic collision, such that the oxygen becomes a negative ion state (commonly referred to a negative ion) when e− (electrons) hit into an outer ring of an oxygen molecule and participates in the movement of the outer ring, and the oxygen becomes a positive ion state (commonly referred to a positive ion) when e− (electrons) hit off one electron in the outer ring of an oxygen molecule.

Due to the AC power supply mode, the ion generation module 34 continuously changes its polarity at high frequency, and produces the same charge repulsive force, thereby alternately generating a large number of unbalanced positive and negative oxygen ions into the air. The alternate generation of positive and negative ions has an ionic-wind expansion effect and presents a strong purification activity, so that the positive and negative ions are continuously blown into the indoor space with the action of air flow.

The physical collision of the positive and negative ions and the chemical interaction among the positive and negative ions may simultaneously meet diversified air purification requirements such as decomposing harmful volatile gases in the air, sterilizing, removing odors and clearing up dust. It is possible to greatly improve the air cleanliness of the existing rail transport vehicles.

Further, the detection device includes several sensors capable of detecting concentrations of positive and negative oxygen ions, PM2.5, CO2, VOC, and/or humidity for the air in the space to be purified. The detection device is mounted within the platform or within the carriage.

Further, the purification device 3 further includes a protection device disposed downstream of the ion generation module 34. The protection device is coated on a metal material downstream of the ion generation module 34, and the protection device is of glass or ceramic.

Further, the control device is connected to the air intake device 1 and the purification device 3 as well as the detection device, and the control device controls the detection device to perform detection such as concentrations of positive and negative oxygen ions, PM2.5, CO2, VOC and humidity and the like for the air within the carriage or within the platform.

Further, the air quality sensor sends the detected data to the control device. Based on the quality of the detected air, the control device controls a working duration of the purification device 3, and at the same time assists in detecting an operational state of the purification device 3 and prompts when cleaning and maintenance are required.

It may be understood that the carriage and the platform are not airtight spaces, so that the concentrations of positive and negative oxygen ions are easily diluted, and the purification effect cannot be achieved. The sensor can timely send the concentration information of positive and negative oxygen ions to the control device to ensure that the concentrations of positive and negative oxygen ions in the air within the carriage and on the platform can achieve the purification effect.

In the present disclosure, specific embodiments are applied to formulate the principles and implementations of the present disclosure. The descriptions of the above embodiments are only intended to help understand the device of the present disclosure and its core concept. Meanwhile, for those ordinarily skilled in the art, according to the concept of the present disclosure, modifications may be made in the specific embodiments and the range of application. In summary, the content of this specification shall not be construed as a limitation to the present disclosure.

LIST OF REFERENCE NUMERALS 1 air intake device;
11 first air damper;
12 return air damper;
13 fresh air damper;
14 second air damper;
15 blower;
2 evaporator;
3 purification device;
32 mounting plate;
33 power supply module;
331 input end;
332 transformer;
333 output end;
34 ion generation module.

The invention claimed is:

1. A positive and negative oxygen ion air purification system using dielectric barrier discharge for rail transport, the system comprising:
   an air intake device including a first damper and a second damper, wherein the first damper is in communication with the second damper;
   an evaporator disposed within the air intake device, wherein gas flowing through the first damper and the second damper passes through the evaporator;
   a purification device, wherein the gas flowing through the first damper and the second damper passes through the purification device, and wherein the purification device includes a mounting plate, a power supply module and an ion generation module, wherein the purification device is disposed on the air intake device by the mounting plate, and the power supply module includes an input end, a transformer, and an output end;
   a detection device; and
   a control device connected to the detection device and which is connected to the air intake device and the purification device,
   wherein the ion generation module includes a high-voltage emission electrode plate, a filling medium and a grounding electrode plate arranged sequentially attached to one another, and
   wherein the power supply module provides high-voltage alternating current to the ion generation module.

2. The positive and negative oxygen ion air purification system-of claim 1, wherein gas is delivered between the first damper and the second damper through a blower.

3. The positive and negative oxygen ion air purification system-of claim 1, wherein the first damper includes at least one of a return air damper and a fresh air damper.

4. The positive and negative oxygen ion air purification system of claim 1, wherein the filling medium is ceramic and/or glass.

5. The positive and negative oxygen ion air purification system of claim 1, wherein the purification device further includes a protective device disposed downstream of the ion generation module, the protective device is coated on a metal material downstream of the ion generation module, and the protective device is composed of a non-metallic material.

6. The positive and negative oxygen ion air purification system of claim 1, wherein the control device is disposed within an air-conditioning unit, within a carriage, and/or on a platform of the rail transport.

7. The positive and negative oxygen ion air purification system of claim 1, wherein the detection device includes a sensor configured to detect concentrations of positive and negative oxygen ions, PM2.5, CO2 and/or VOC, and/or humidity.

8. The positive and negative oxygen ion air purification system of claim 1, wherein the detection device is disposed at the first damper, within an air-conditioning unit, within an air duct of a vehicle, within a carriage, and/or on a platform.

\* \* \* \* \*